United States Patent
Yasui et al.

(10) Patent No.: US 7,489,995 B2
(45) Date of Patent: Feb. 10, 2009

(54) VEHICLE MOTION STABILITY CONTROL APPARATUS

(75) Inventors: Yoshiyuki Yasui, Nagoya (JP); Toshihisa Kato, Handa (JP); Eiichi Ono, Toyota (JP); Yuji Muragishi, Owariasahi (JP); Tomoko Sugawara, Susono (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 436 days.

(21) Appl. No.: 11/442,535

(22) Filed: May 30, 2006

(65) Prior Publication Data
US 2006/0276944 A1 Dec. 7, 2006

(30) Foreign Application Priority Data
Jun. 1, 2005 (JP) .............................. 2005-161514

(51) Int. Cl.
*B60G 17/018* (2006.01)
*B60G 23/00* (2006.01)

(52) U.S. Cl. ............................. 701/37; 701/36; 701/48; 701/70; 701/78; 701/83

(58) Field of Classification Search ................... 701/36, 701/37, 42–43, 48, 70, 78, 82–84; 180/167, 180/172
See application file for complete search history.

(56) References Cited

U.S. PATENT DOCUMENTS

| 5,737,643 | A | * | 4/1998 | Kitagawa et al. ............... 396/55 |
| 5,748,231 | A | * | 5/1998 | Park et al. .............. 348/207.99 |
| 6,263,261 | B1 | | 7/2001 | Brown et al. |

FOREIGN PATENT DOCUMENTS

JP    11-304663 A    11/1999

OTHER PUBLICATIONS

"Vehicle Dynamics Control", Automotive Handbook, published by Robert Bosch GmbH, pp. 668-677, Oct. 1996 (cited in specification).

* cited by examiner

*Primary Examiner*—Gertrude Arthur Jeanglaud
(74) *Attorney, Agent, or Firm*—Buchanan Ingersoll & Rooney PC

(57) ABSTRACT

An angular velocity detection device is provided for detecting an angular velocity about a single axis tilted in a longitudinal direction of a vehicle to a normal axis thereof. An actual motion state variable of the vehicle is calculated on the basis of the detected angular velocity. At least one of the braking force and driving force applied to a vehicle is controlled to stabilize a yawing motion and a rolling motion of the vehicle, on the basis of a motion state variable deviation between a desired motion state variable and the actual motion state variable, e.g., a deviation between a yaw velocity and a roll velocity of the vehicle.

5 Claims, 12 Drawing Sheets

VEHICLE MOTION STABILITY CONTROL APPARATUS

This application claims priority under 35 U.S.C. Sec. 119 to No.2005-161514 filed in Japan on Jun. 1, 2005, the entire content of which is herein incorporated by reference.

BACKGROUND OF THE INVENTION

The present invention relates to a vehicle motion stability control apparatus, and particularly relates to an apparatus for controlling at least one of braking force and driving force applied to a vehicle, to stabilize a motion thereof.

In order to improve a stability of a vehicle, there is known heretofore a vehicle motion control apparatus for stabilizing a yawing motion of the vehicle. As an example of the apparatus, a vehicle dynamics control (VDC) system for maintaining a stability of a vehicle in a lateral direction thereof is explained in pages 668-677 of a book entitled AUTOMOTIVE HANDBOOK published by Robert Bosch GmbH, in October, 1996. That system is explained as the one that prevents the vehicle "pushing out" of the turn or spinning out of the turn when it is steered, and it is a closed-loop (feedback) control system integrated within the vehicle's brake system and powertrain. It describes how the vehicle is to behave at the physical driving limit in accordance with a driver's input, and how it actually behaves, and describes that in order to minimize the difference between nominal and actual behavior (deviation), the tire forces are controlled by actuators, and the VDC controller is controlled, with slip angle and yaw rate provided for the state variable.

U.S. Pat. No. 6,263,261 discloses a roll control system for use in a vehicle that is not dependent upon the turning condition of the vehicle. And, it discloses a plurality of sensors sensing the dynamic conditions of the vehicle and including a speed sensor, a lateral acceleration sensor, a roll rate sensor, and a yaw rate sensor are coupled to a controller, which determines a roll angle estimate in response to lateral acceleration, roll rate, vehicle speed, and yaw rate, and which determines a brake pressure distribution in response to the relative roll angle estimate.

Also, Japanese Patent Laid-open Publication No.11-304663 and its English abstract of esp@cenet database, discloses a device to rationally estimate the behavior of a vehicle such as a skid and a wheel lift by real-time operation, and to estimate the height of center of gravity. It is described in the English abstract that the transfer function of roll for the steering angle of a dynamics model with degree of freedom including the roll is equal to that of the roll for the steering angle being obtained by the AR method (auto-regressive method) from data being sampled from a loaded vehicle, thus deriving the height of center of gravity by comparing coefficients.

In order to ensure the stability for the yawing motion and rolling motion of the vehicle, it is required to combine the apparatus for stabilizing the yawing motion of the vehicle (yawing motion stability control apparatus) as described in the aforementioned book, and the apparatus for stabilizing the rolling motion of the vehicle (rolling motion stability control apparatus) as described in the aforementioned United States Patent. Supposing that those apparatuses are combined together, signals of the sensors commonly required by those apparatuses can be used commonly. However, with respect to the apparatus for stabilizing the yawing motion, for example, such a new sensor for detecting the rolling motion as a roll velocity sensor (roll rate sensor) or the like is required. In addition, as a roll increasing tendency in the rolling motion of the vehicle varies in dependence on loading conditions or the number of passengers, it is also required to detect a height of the center of gravity of the vehicle or the like, thereby to determine the roll increasing tendency during cornering operation of the vehicle properly. In the aforementioned Japanese Patent Laid-open Publication, the roll rate sensor has been used for estimating the height of the center of gravity.

SUMMARY OF THE INVENTION

Accordingly, it is an object of the present invention to provide a vehicle motion stability control apparatus for improving a stability of a vehicle in both of its yawing motion and its rolling motion, by means of an angular velocity detection device with a single axis.

In accomplishing the above and other objects, the vehicle motion stability control apparatus is adapted to control at least one of braking force and driving force applied to a vehicle, to stabilize a motion thereof. The apparatus comprises an angular velocity detection device for detecting an angular velocity about a single axis tilted in a longitudinal direction of the vehicle to a normal axis of the vehicle, an actual motion state variable calculation device for calculating an actual motion state variable indicative of an actual vehicle motion state variable of the vehicle, on the basis of the angular velocity detected by the angular velocity detection device, a desired motion state variable setting device for setting a desired motion state variable indicative of a desired vehicle motion state variable of the vehicle, and a motion state variable deviation calculation device for calculating a deviation between the desired motion state variable set by the desired motion state variable setting device and the actual motion state variable calculated by the actual motion state variable calculation device. And, a controller is provided for controlling at least one of the braking force and driving force applied to the vehicle, on the basis of the deviation calculated by the motion state variable deviation calculation device.

The vehicle motion state variable may be a yaw state variable indicative of a state variable of a yawing motion of the vehicle, so that the desired motion state variable may be a desired yaw state variable, and the actual motion state variable may be an actual yaw state variable. In this case, therefore, the deviation between the desired motion state variable and the actual motion state variable may be a yaw state variable deviation between the desired yaw state variable and the actual yaw state variable.

Or, the vehicle motion state variable may be a roll state variable indicative of a state variable of a rolling motion of the vehicle, so that the desired motion state variable may be a desired roll state variable, and the actual motion state variable may be an actual roll state variable. In this case, therefore, the deviation between the desired motion state variable and the actual motion state variable may be a roll state variable deviation between the desired roll state variable and the actual roll state variable.

Preferably, the apparatus as described above may further comprise a yaw velocity estimation device for estimating a yaw velocity of the vehicle on the basis of the vehicle motion state variable, a roll velocity conversion device for converting the angular velocity detected by the angular velocity detection device into a roll velocity of the vehicle, on the basis of the yaw velocity estimated by the yaw velocity estimation device, and a roll parameter estimation device for estimating a roll parameter indicative of a roll increasing tendency of the vehicle, on the basis of the roll velocity converted by the roll velocity conversion device. And, the controller is adapted to control at least one of the braking force and driving force applied to the vehicle, on the basis of the roll parameter estimated by the roll parameter estimation device.

BRIEF DESCRIPTION OF THE DRAWINGS

The above stated object and following description will become readily apparent with reference to the accompanying drawings, wherein like referenced numerals denote like elements, and in which.

DETAILED DESCRIPTION OF EMBODIMENTS

Figure 1:
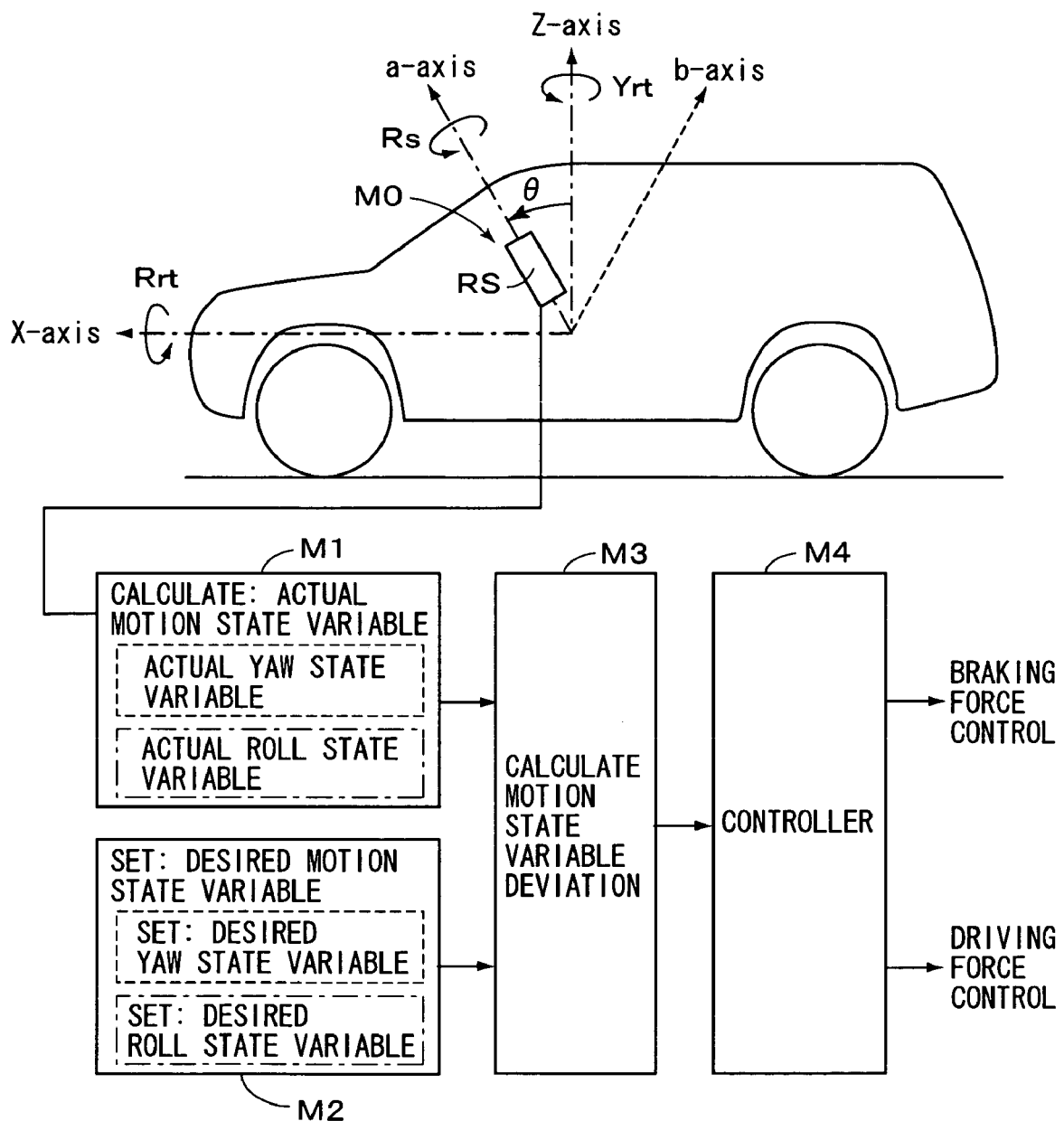
FIG. 1 is a schematic block diagram of a vehicle motion stability control apparatus according to an embodiment of the present invention.

Referring to FIG. 1, there is schematically illustrated a vehicle motion stability control apparatus for controlling at least one of braking force and driving force applied to a vehicle, to stabilize a motion thereof, according to an embodiment of the present invention. The apparatus is provided with an angular velocity detection device M0, which detects an angular velocity about a single axis tilted in a longitudinal direction (forward and backward) of the vehicle to a normal axis of the vehicle. The apparatus includes an actual motion state variable calculation device M1, which calculates an actual motion state variable indicative of an actual vehicle motion state variable of the vehicle, on the basis of the angular velocity detected by the angular velocity detection device M0, a desired motion state variable setting device M2, which sets a desired motion state variable indicative of a desired vehicle motion state variable of the vehicle, and a motion state variable deviation calculation device M3, which calculates a deviation between the desired motion state variable set by the desired motion state variable setting device M2 and the actual motion state variable calculated by the actual motion state variable calculation device M1. A controller M4 is provided for controlling at least one of the braking force and driving force applied to the vehicle, on the basis of the deviation calculated by the motion state variable deviation calculation device M3.

Figure 16:
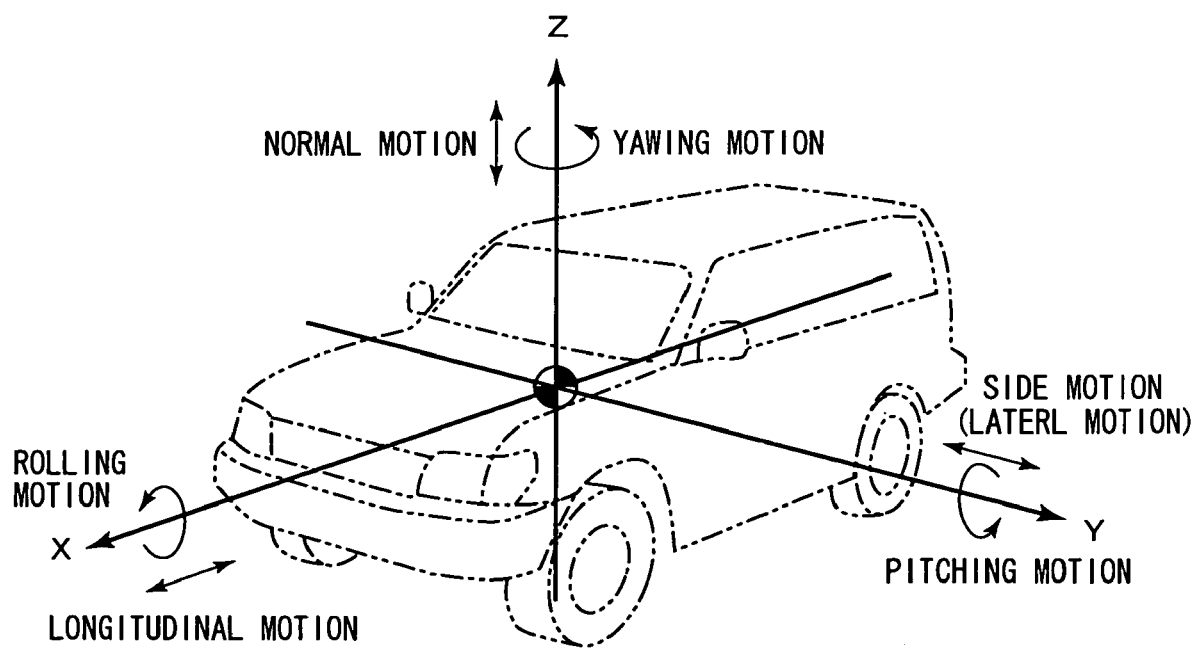
FIG. 16 is a perspective view of a vehicle for explaining definitions of a coordinate fixed on a vehicle and vehicle motion.

As shown in FIG. 16, the vehicle motions are defined on a coordinate fixed on a vehicle. As an origin for the coordinate fixed on the vehicle, employed is a position of the center of gravity of the vehicle as illustrated by two-dot chain lines in FIG. 16, with X-axis extending in a longitudinal direction of the vehicle, Y-axis extending in a side (lateral) direction, and Z-axis extending in a normal direction. Based on the coordinate, the vehicle motions are defined such that a motion in parallel with the X-axis is defined as a longitudinal motion, a motion in parallel with the Y-axis is defined as a side (lateral) motion, and a motion in parallel with the Z-axis is defined as a normal motion. Also, a rotational motion about the X-axis is defined as a rolling motion, a rotational motion about the Y-axis is defined as a pitching motion, and a rotational motion about the Z-axis is defined as a yawing motion. And, a X-Y plane formed with the X-axis and the Y-axis is called as a yaw plane, a X-Z plane formed with the X-axis and the Z-axis is called as a pitch plane, and a Y-Z plane formed with the Y-axis and the Z-axis is called as a roll plane.

As for the angular velocity detection device M0, employed is an angular velocity sensor (single axis rate sensor) with its detecting axis of a single axis, which is tilted forward or backward of the vehicle to the normal axis of the vehicle on the pitch plane as shown in FIG. 16 or a plane in parallel therewith, whereby not only the yawing motion (yaw velocity) of the vehicle but also the rolling motion (roll velocity) can be detected. Then, the desired state variable of the vehicle is provided, and compared with the actual state variable of the vehicle calculated on the basis of the angular velocity including the yaw velocity and roll velocity, to provide a deviation between them, on the basis of which the braking force or driving force is controlled to stabilize both of the yawing motion and rolling motion. Particularly, if the tilt angle ($\theta$) of the detecting axis of the angular sensor as described above was provided to be within a range of 6 degree$\leq \theta \leq$46 degree, then a yaw velocity close to the actual yaw velocity could be detected, and a certain level of roll velocity could be obtained, as well.

As for the vehicle motion state variable, therefore, the yaw state variable indicates the state variable of the yawing motion of the vehicle. In this case, as indicated by broken line frames in FIG. 1, the desired motion state variable corresponds to a desired yaw state variable, and the actual motion state variable corresponds to an actual yaw state variable, so that the deviation between the desired motion state variable and the actual motion state variable corresponds to a yaw state variable deviation between them. Or, as for the vehicle motion state variable, the roll state variable indicates the state variable of the rolling motion of the vehicle. In this case, therefore, as indicated by one-dot chain line frames in FIG. 1, the desired motion state variable corresponds to a desired roll state variable, and the actual motion state variable corresponds to an actual roll state variable, so that the motion state variable deviation corresponds to a roll state variable deviation between them.

The apparatus may be formed by further including a yaw velocity estimation device which estimates a yaw velocity of the vehicle on the basis of the vehicle motion state variable, a roll velocity conversion device which converts the angular velocity detected by the angular velocity detection device M0 into a roll velocity of the vehicle, on the basis of the yaw velocity estimated by the yaw velocity estimation device, and a roll parameter estimation device which estimates a roll parameter indicative of a roll increasing tendency of the vehicle, on the basis of the roll velocity converted by the roll velocity conversion device. And, the controller M4 is adapted to control at least one of the braking force and driving force applied to the vehicle, on the basis of the roll parameter estimated by the roll parameter estimation device. The yaw velocity estimation device or the like as described above will be explained later in detail.

As for the angular velocity detection device M0, an angular velocity sensor RS may be employed, as shown in FIG. 1, with its detecting axis of a single axis provided for detecting the angular velocity (Rs) about an a-axis, which is tilted at a predetermined angle ($\theta$), in a longitudinal direction of the vehicle (forward in FIG. 1) to the normal axis (Z-axis) of the vehicle. The a-axis served as the detecting axis for detecting the angular velocity in the angular velocity sensor RS, is provided on the pitch plane, i.e., the X-Z plane formed with the X-axis and the Z-axis, or a plane in parallel with the pitch plane. Or, the detecting axis for detecting the angular velocity in the angular velocity sensor RS, may be tilted backward of the vehicle, to provide the b-axis as indicated by a broken line in FIG. 1 to the normal axis (Z-axis). The angular velocity (Rs) detected by the angular velocity sensor RS will be described later.

Figure 2:
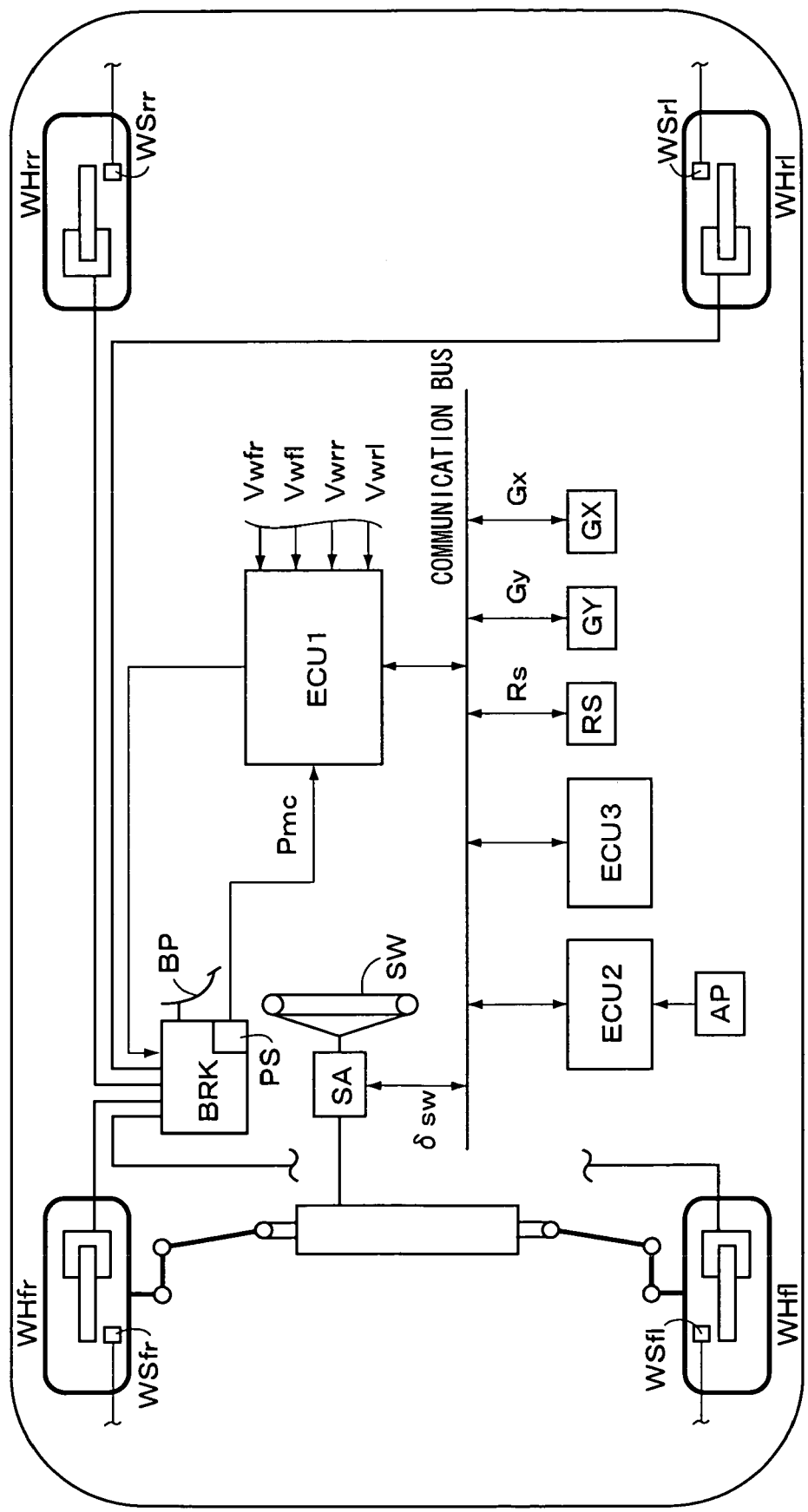
FIG. 2 is a schematic block diagram of a vehicle having a vehicle motion stability control apparatus according to an embodiment of the present invention.

Referring to FIG. 2, there is schematically illustrated an overall structure of a vehicle with the vehicle motion stability control apparatus according to an embodiment of the present invention. A brake system electronic control unit ECU1, engine system electronic control unit ECU2, and instrument panel electronic control unit ECU3 are connected to one another through a communication bus, so that the information for each control unit can be provided commonly. Furthermore, there are provided a steering angle sensor SA for detecting a steering angle ($\delta$sw) of a steering wheel SW, a longitudinal acceleration sensor GX for detecting a vehicle longitudinal acceleration (Gx), a lateral acceleration sensor GY for detecting a vehicle lateral acceleration (Gy), and the angular velocity sensor RS for detecting the angular velocity (Rs), which are electrically connected to each electronic control unit to supply thereto the sensor signals. A brake actuator BRK is provided for applying the braking force to each wheel in response to depression of a brake pedal BP of the vehicle driver, and controlling the braking force on each wheel independently in response to a signal from the electronic control unit ECU1, when a vehicle motion stability control as described later is required. A pressure sensor PS is provided in the brake actuator BRK for detecting an amount of operation of the brake pedal BP by the vehicle driver, to feed its detected pressure, i.e., master cylinder pressure (Pmc) to the brake system electronic control unit ECU1. The braking force control for the rolling motion stability control can be performed, even in the case where the vehicle driver is not operating the brake pedal BP.

As shown in FIG. 2, at each wheel WHxx of the vehicle, there is provided a wheel speed sensor WSxx, which is connected to the electronic control unit ECU1, wherein "xx" designates each wheel, i.e., "fr" designates the wheel at the front right side as viewed from the position of a driver's seat, "fl" designates the wheel at the front left side, "rr" designates the wheel at the rear right side, and "rl" designates the wheel at the rear left side. And, a signal having pulses proportional to a rotational speed of each wheel, i.e., a wheel speed signal (Vwxx) is fed to the electronic control unit ECU1, wherein a vehicle speed (V) in the longitudinal direction of the vehicle is calculated on the basis of the wheel speed signal (Vwxx) fed from the wheel speed sensor WSxx. The amount of operation (Ap) of an accelerator pedal (not shown) is detected by an accelerator pedal sensor AP, and fed to the electronic control unit ECU1 through the communication bus as described before.

According to the present embodiment, the vehicle motion stability control is performed in the brake system electronic control unit ECU1. When the vehicle motion stability control starts, the braking force applied to each wheel is controlled independently, so as to ensure the vehicle stability. Furthermore, signals for controlling the driving force applied to the wheel are fed to the engine system electronic control unit ECU2 through the communication bus, so as to reduce engine torque by controlling a throttle opening, ignition timing, amount of fuel to be injected and so on, and control the driving force applied to the wheel. At the same time, notification signals are fed to the instrument panel electronic control unit ECU3 through the communication bus, so as to actuate a visible or audible annunciator (not shown) for notifying the vehicle driver of the vehicle state.

Next will be explained the angular velocity (Rs) detected by the angular velocity sensor RS. In the case where the angular velocity sensor RS is used for the yawing motion stability control, for example, the detecting axis of the angular velocity sensor RS is placed in parallel with the normal axis (Z-axis) of the vehicle. According to the present embodiment, however, the angular velocity sensor RS as shown in FIGS. 1 and 2, which is served as the angular velocity detection device with the single axis according to the present invention, the detecting axis of the angular velocity sensor RS is tilted at the predetermined angle ($\theta$) (hereinafter, called as tilt angle ($\theta$)) forward or backward to the normal axis (Z-axis) of the vehicle, to be capable of detecting the yaw velocity (Yrt) and roll velocity (Rrt) simultaneously, so as to perform the stability control for the yawing motion and rolling motion. The angular velocity (Rs) detected by the angular velocity sensor RS, the roll velocity (Rrt), which may be called as roll rate, and the yaw velocity (Yrt), which may be called as yaw rate, will provide such a relationship as indicated by an equation (1);

$$Rs = Rrt \cdot \sin\theta + Yrt \cdot \cos\theta \quad (1)$$

Figure 3:
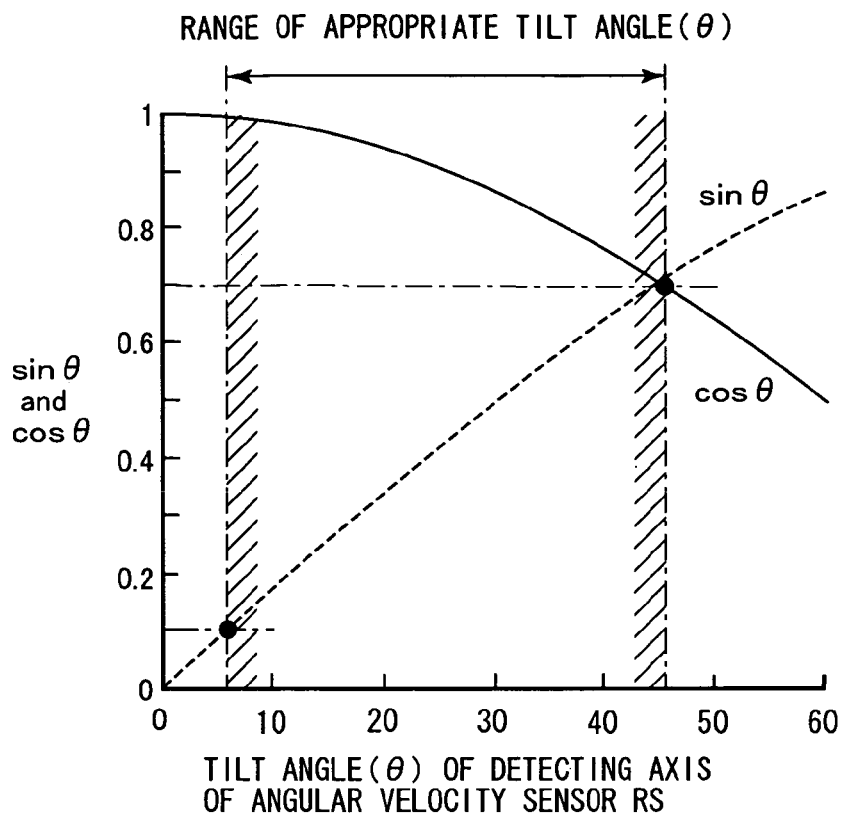
FIG. 3 is a diagram showing a relationship between a gain (cos θ) for a yaw velocity and a gain (sin θ) for a roll velocity, with a detecting axis of an angular velocity sensor being varied, according to an embodiment of the present invention.

At the out set, with respect to a range of the tilt angle ($\theta$) of the detecting axis of the angular velocity sensor RS, the angular velocity (Rs) detected by the angular velocity sensor RS may correspond to the value of the yaw velocity (Yrt) and roll velocity (Rrt) multiplied by gains ($\cos\theta$ and $\sin\theta$) which are determined by the tilt angle ($\theta$), according to the equation (1). With the tilt angle ($\theta$) of the detecting axis of the angular velocity sensor RS being changed, the gain ($\cos\theta$) for the yaw velocity will vary as indicated by a solid line in FIG. 3, and the gain ($\sin\theta$) for the roll velocity will vary as indicated by a broken line in FIG. 3. Therefore, in the case where the tilt angle ($\theta$) is set to be zero, the angular velocity sensor RS acts as a yaw velocity sensor. In the case where the tilt angle ($\theta$) is set to be 90 degree, however, the angular velocity sensor RS acts as the roll velocity sensor.

As the stability control for the yawing motion and rolling motion can be achieved by the angular velocity detection device with the single axis, to provide a non-linear relationship between the angular velocity (Rs) and the tilt angle ($\theta$), according to the present invention, such a range that the gain ($\cos\theta$) for the yaw velocity is high and a certain level of gain ($\sin\theta$) for the roll velocity can be ensured, is appropriate for the range of the tilt angle ($\theta$). Therefore, if the gain ($\cos\theta$) for the yaw velocity is close to 1, e.g., $\cos\theta \geq 0.7$, the angular velocity (Rs) detected by the angular velocity sensor RS can be effectively used for the stability control of the yawing motion. Furthermore, if the gain ($\sin\theta$) for the roll velocity is equal to or greater than a certain value, e.g., $\sin\theta \geq 0.1$, the angular velocity (Rs) is affected by the rolling motion. Consequently, it is desirable that the tilt angle ($\theta$) of the detecting axis is within a range of 6 degree $\leq \theta \leq$ 46 degree.

Figure 4:
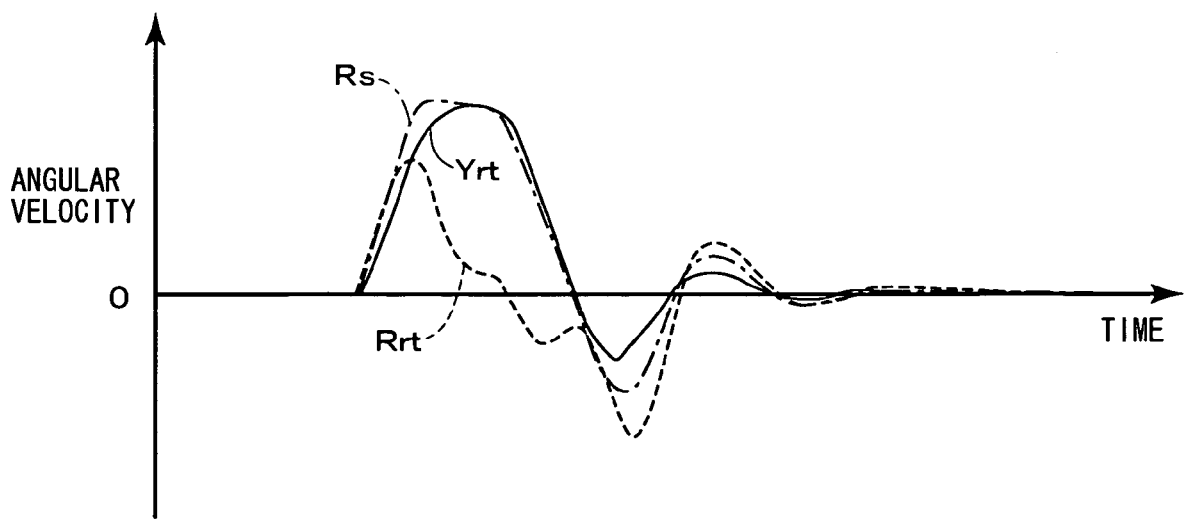
FIG. 4 is a diagram showing an example of variations of a yaw velocity (Yrt), a roll velocity (Rrt), and an angular velocity (Rs) detected by an angular velocity sensor, in the case where the steering wheel was steered to turn a vehicle, then returned to its original position for moving the vehicle straight.

In the case where the steering wheel SW is rapidly steered to turn the vehicle, then returned to its original position for moving the vehicle straight, for example, the angular velocity varies as shown in FIG. 4. That is, the yaw velocity (Yrt) varies as indicated by a solid line in FIG. 4, and the roll velocity (Rrt) varies as indicated by a broken line in FIG. 4. Furthermore, the angular velocity (Rs) detected by the angular velocity sensor RS with the tilt angle ($\theta$) of the detecting axis varies as indicated by a one-dot chain line in FIG. 4. As apparent from FIG. 4, a roll inertial mass of the vehicle is relatively small comparing with a yaw inertial mass of the vehicle. Therefore, the rolling motion with the roll velocity (Rrt) is produced earlier than the yawing motion with the yaw velocity (Yrt), and reduced earlier than that. The yaw velocity (Yrt) varies in response to a steering operation. As the detected angular velocity (Rs) is added by the roll velocity in accordance with the tilt angle ($\theta$) as defined in the aforementioned equation (1), the detected angular velocity (Rs) is raised earlier than the yaw velocity (Yrt). In the case where the roll velocity (Rrt) is relatively large, the detected angular velocity (Rs) will become larger than the yaw velocity (Yrt).

Accordingly, if the known yawing motion stability control is executed in response to the angular velocity (Rs) detected by the angular velocity sensor RS with the tilt angle ($\theta$) of the detecting axis, the apparatus will act in the same manner as the prior yawing motion stability control apparatus, when the rolling motion (roll velocity) is relatively small, whereby the yawing motion of the vehicle can be stabilized. On the contrary, if the rolling motion (roll velocity) is so large that the roll increasing tendency of the vehicle appears, the roll velocity will affect the angular velocity (Rs). Therefore, the vehicle motion stability control will be made earlier than the prior yawing motion stability control, with a larger control amount. Consequently, not only the yawing motion of the vehicle can be stabilized, but also the stability of rolling motion of the vehicle can be improved.

Figure 5:
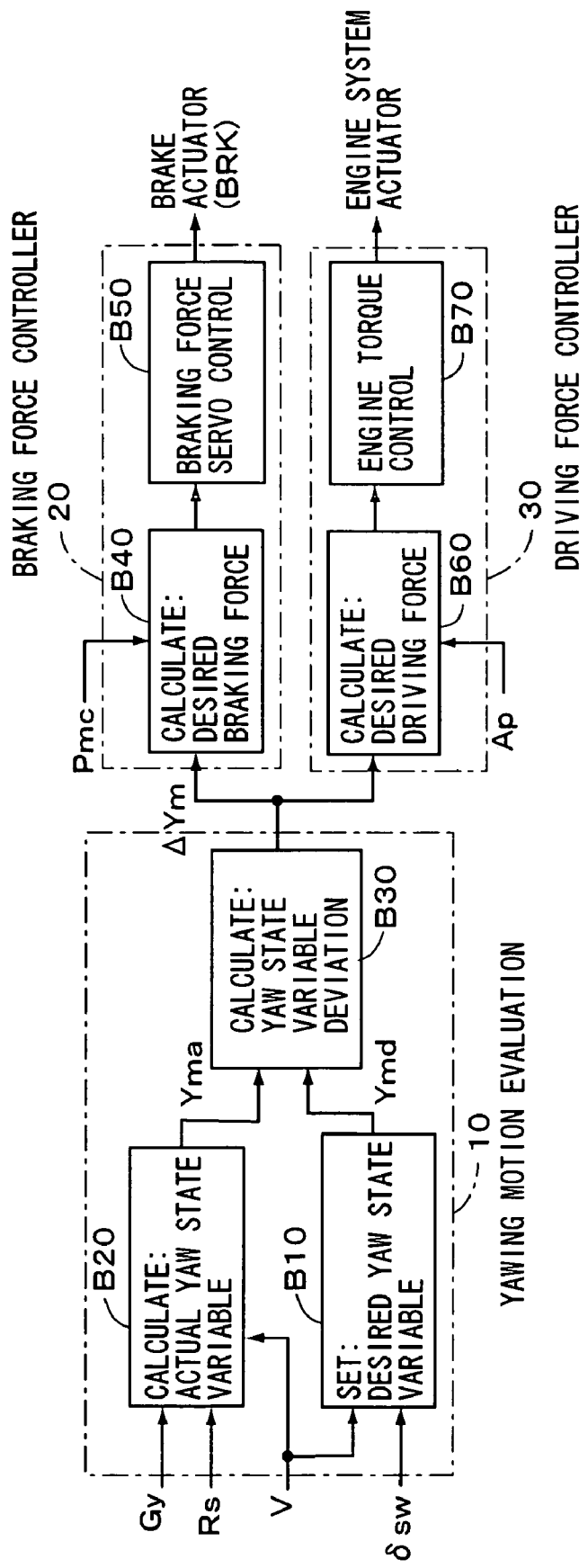
FIG. 5 is a block diagram of a device for performing a stability control for a vehicle motion, with an angular velocity detected by an angular velocity sensor having a tilted detecting axis, according to an embodiment of the present invention.

FIG. 5 shows an embodiment of a device provided with the angular velocity sensor RS for detecting the angular velocity about the axis with the tilt angle ($\theta$) tilted forward or backward to the normal axis of the vehicle as described before, to perform the stability control of the vehicle motion in response to the angular velocity (Rs). At the outset, the state of yawing motion of the vehicle is evaluated by a yawing motion evaluation device 10, on the basis of one of the state variables, or a combination of a plurality of state variables, out of yaw velocity, vehicle slip angle, wheel slip angle, vehicle slip angular velocity, wheel slip angular velocity, and the state variables calculated on the basis of them. For instance, as shown in FIG. 5, a desired yaw state variable (Ymd) is calculated at a block B10, on the basis of the steering angle ($\delta$sw) indicative of operation of the steering wheel SW by the vehicle driver, and the vehicle speed (V). Also, an actual yaw state variable (Yma) indicative of the actual yawing operation is calculated at a block B20, on the basis of the vehicle speed (V), lateral acceleration (Gy) and angular velocity (Rs). As for the actual yaw state variable (Yma), the state variable corresponding to the desired yaw state variable (Ymd) is selected. And, a deviation between the desired yaw state variable (Ymd) and the actual yaw state variable (Yma), i.e., yaw state variable deviation ($\Delta$Ym) is calculated at a block B30.

Although the desired yaw state variable (Ymd) is provided on the basis of the steering angle ($\delta$sw) and the vehicle speed (V) at the block B10, if the slip angle (vehicle slip angle or wheel slip angle) or slip angular velocity is used as the yaw state variable, the desired yaw state variable (Ymd) can be provided independently of the steering angle ($\delta$sw) or the vehicle speed (V). This is because the lateral force of the wheel is produced in accordance with the wheel slip angle, and reaches its limit at a predetermined wheel slip angle to be saturated. For example, according to a conventional tire, as the lateral force is saturated with the wheel slip angle of around 10 degree on an asphalt road surface, the desired slip angle (desired yaw state variable) can be set to be around 10 degree. As the wheel slip angle obtained when the lateral force is saturated varies in dependence on a road coefficient of friction $\mu$, the desired slip angle can be set to vary on the basis of the estimated result of the road coefficient of friction $\mu$.

Figure 6:
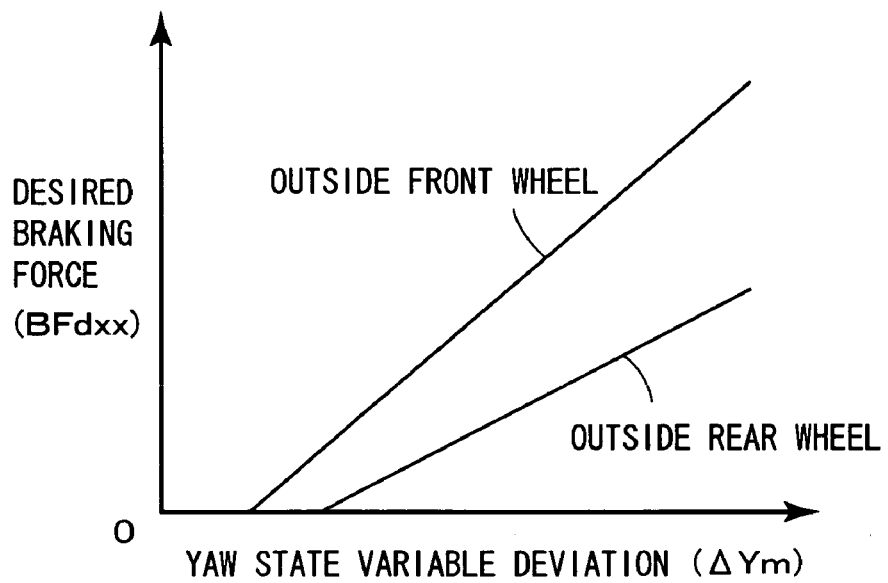
FIG. 6 is a diagram showing an example of a map for setting a desired braking force on the basis of a deviation of yaw state variable in case of an oversteer, according to an embodiment of the present invention.
Figure 7:
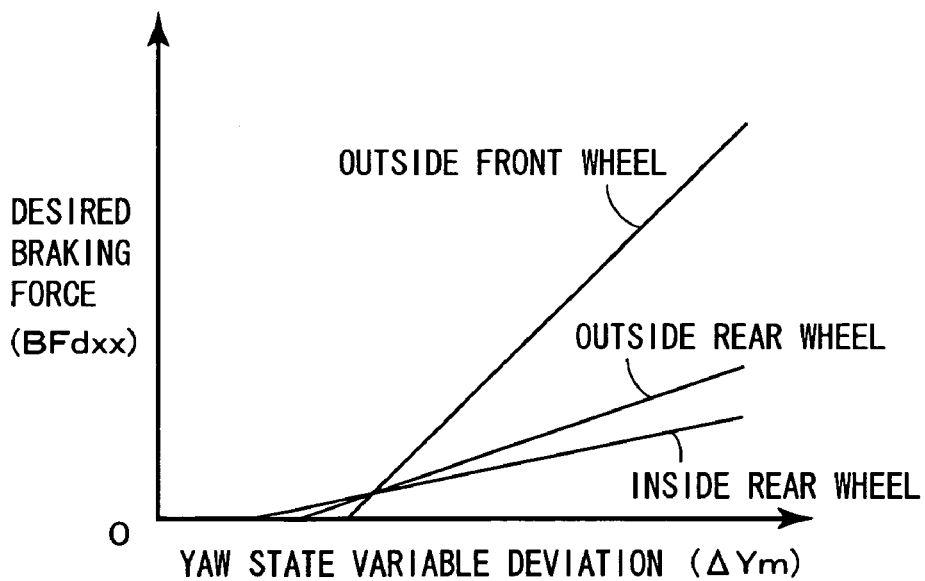
FIG. 7 is a diagram showing an example of a map for setting a desired braking force on the basis of a deviation of yaw state variable in case of an understeer, according to an embodiment of the present invention.

According to a braking force controller 20, the driving signal for the brake actuator BRK is produced in accordance with the yaw state variable deviation ($\Delta$Ym). At a block B40, a desired braking force (BFxx) for each wheel WHxx is calculated individually in accordance with the yaw state variable deviation ($\Delta$Ym). In this respect, the barking operation of the vehicle driver is taken into consideration for the calculation of the desired braking force, through the pressure signal (Pmc) output from the pressure sensor PS. The desired braking force (BFxx) is set in accordance with the vehicle steering characteristic (understeer or oversteer characteristic). In case of the oversteer for example, as shown in FIG. 6, it is so arranged that increase of the braking force applied to a front wheel located on the outside of a curve in the vehicle's path during cornering operation of the vehicle, and increase of the braking force applied to a rear wheel located on the outside of the curve are provided on the basis of the yaw state variable deviation (ΔYm), respectively. And, with the braking force control being executed, the yawing moment directed to the outside of the curve is produced, and the vehicle speed is reduced. On the contrary, in case of the understeer, as shown in FIG. 7, it is so arranged that increase of the braking force applied to a rear wheel located on the inside of the curve, increase of the braking force applied to the rear wheel located on the outside of the curve, and increase of the braking force applied to the front wheel located on the outside of the curve are provided on the basis of the yaw state variable deviation (ΔYm), respectively, so that the yawing moment directed to the inside of the curve is produced, and the vehicle speed is reduced.

In the rolling motion and yawing motion, it is effective for ensuring the vehicle stability to reduce the vehicle speed. Therefore, in order to reduce the vehicle speed rapidly, with the yawing moment being controlled appropriately, one wheel or plurality of wheels may be selected as the wheel to be controlled with the braking force applied thereto. For example, it is effective to apply the braking force to all of four wheels, one wheel of the front wheel located on the outside of the curve during cornering operation of the vehicle, two front wheels and the rear wheel located on the inside of the curve, or two front wheels and the rear wheel located on the outside of the curve. Then, after the desired braking force for each wheel was calculated, the braking force applied to each wheel is controlled by servo to follow the desired braking force, to output a control signal fed to the brake actuator BRK.

In the same manner as the braking force control, in order to reduce the driving force, a control for reducing engine torque is performed by a driving force controller 30, in accordance with the yaw state variable deviation (ΔYm). At a block B60, a desired driving force for ensuring the vehicle stability is calculated on the basis of the yaw state variable deviation (ΔYm) and an amount (Ap) of operation of the accelerator pedal AP by the vehicle driver. Then, the amount of engine torque to be reduced is determined at a block B70, and the control signal is output to an engine system actuator (not shown) so as to control the throttle opening, ignition timing, amount of fuel to be injected and so on.

As explained with reference to FIG. 4, in the case where the roll velocity is produced largely, and the roll increasing tendency of the vehicle is raised, the roll velocity will affect the angular velocity (Rs), so that the angular velocity (Rs) will be produced earlier than the yaw velocity, to be larger in value. Therefore, the actual yaw state variable (Yma) will become larger than the actual yawing motion, so that the yaw state variable deviation (ΔYm) will be calculated to be larger. Then, as the braking force determined in accordance with the yaw state variable deviation (ΔYm) will act earlier, to be larger, not only the yawing motion but also the rolling motion can be stabilized. Furthermore, with respect to the driving force control, the control for reducing the engine torque will be performed much earlier.

Figure 8:
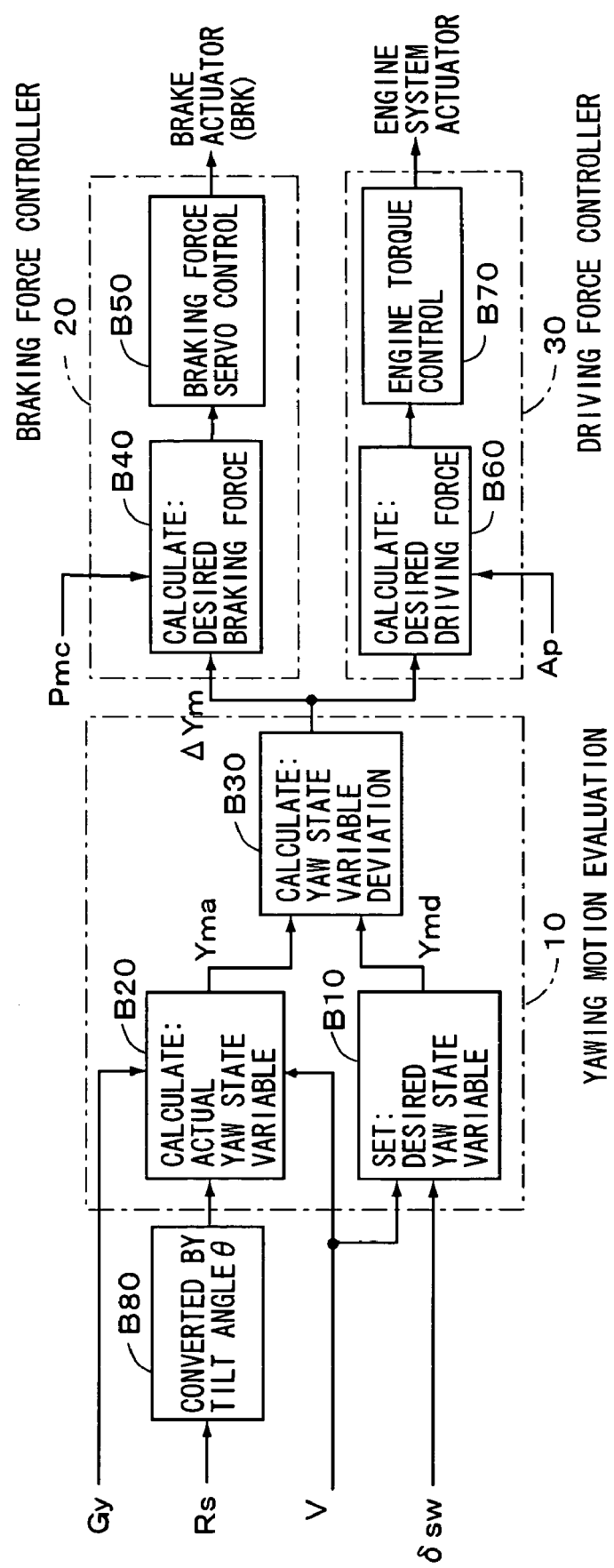
FIG. 8 is a block diagram of a device for performing a stability control for a vehicle motion, with an angular velocity detected by an angular velocity sensor having a tilted detecting axis, as a variation to an embodiment of the present invention.

FIG. 8 relates to an embodiment of the apparatus for converting the angular velocity (Rs) by the tilt angle, to calculate the actual yaw state variable, as a modified embodiment to the embodiment as shown in FIG. 5. The yawing motion evaluation device 10, braking force controller 20 and driving force controller 30 as shown in FIG. 5 are the same as those with the same reference numerals as shown in FIG. 8. In addition to them, a tilt angle conversion block B80 is provided in FIG. 8. In order to raise an effect of the stability to the rolling motion, the tilt angle (θ) of the detecting axis of the angular velocity sensor RS is required to be large, to enlarge the gain (sin θ) for the roll velocity. On the other hand, if the tilt angle (θ) is enlarged, the gain (cos θ) for the yaw velocity is reduced, so that an effect of stability to the yawing motion will be reduced. Therefore, the angular velocity (Rs) of the angular velocity sensor RS is converted on the basis of the tilt angle (θ) of the detecting axis, to be modified. That is, according to the tilt angle conversion block B80 in FIG. 8, the angular velocity (Rs) is converted by the tilt angle (θ) of the angular velocity sensor RS, into a tilt angle converted angular velocity (Rs1), as indicated by an equation (2);

$$Rs1 = Rs/\cos\theta \quad (2)$$

With the tilt angle (θ) of the detecting axis of the angular velocity sensor RS modified by the equation (2) as described above, in the case where the roll velocity is relatively small, relatively more accurate yaw velocity can be obtained. On the other hand, in the case where the roll velocity is relatively large, the roll velocity affects the yaw state variable deviation, so that the barking force control and driving force control can be performed earlier, with a larger amount of control, whereby the rolling motion can be stabilized, together with the yawing motion. In the equation (2), the conversion is made on the basis of the actual tilt angle (θ), whereas an angle (θ') smaller than the actual tilt angle (θ) may be used. In the latter case, a tilt angle converted angular velocity (Rs2) is indicated by an equation (3) as follows;

$$Rs2 = Rs/\cos\theta' \quad (3)$$

where θ'<θ, and wherein the equation (3) means that if the actual tilt angle (θ) is 30 degree, i.e., cos θ=0.866, then the tilt angle converted angular velocity (Rs2) may be obtained, with the actual tilt angle (θ') being 25 degree, i.e., cos θ'=0.906.

Figure 9:
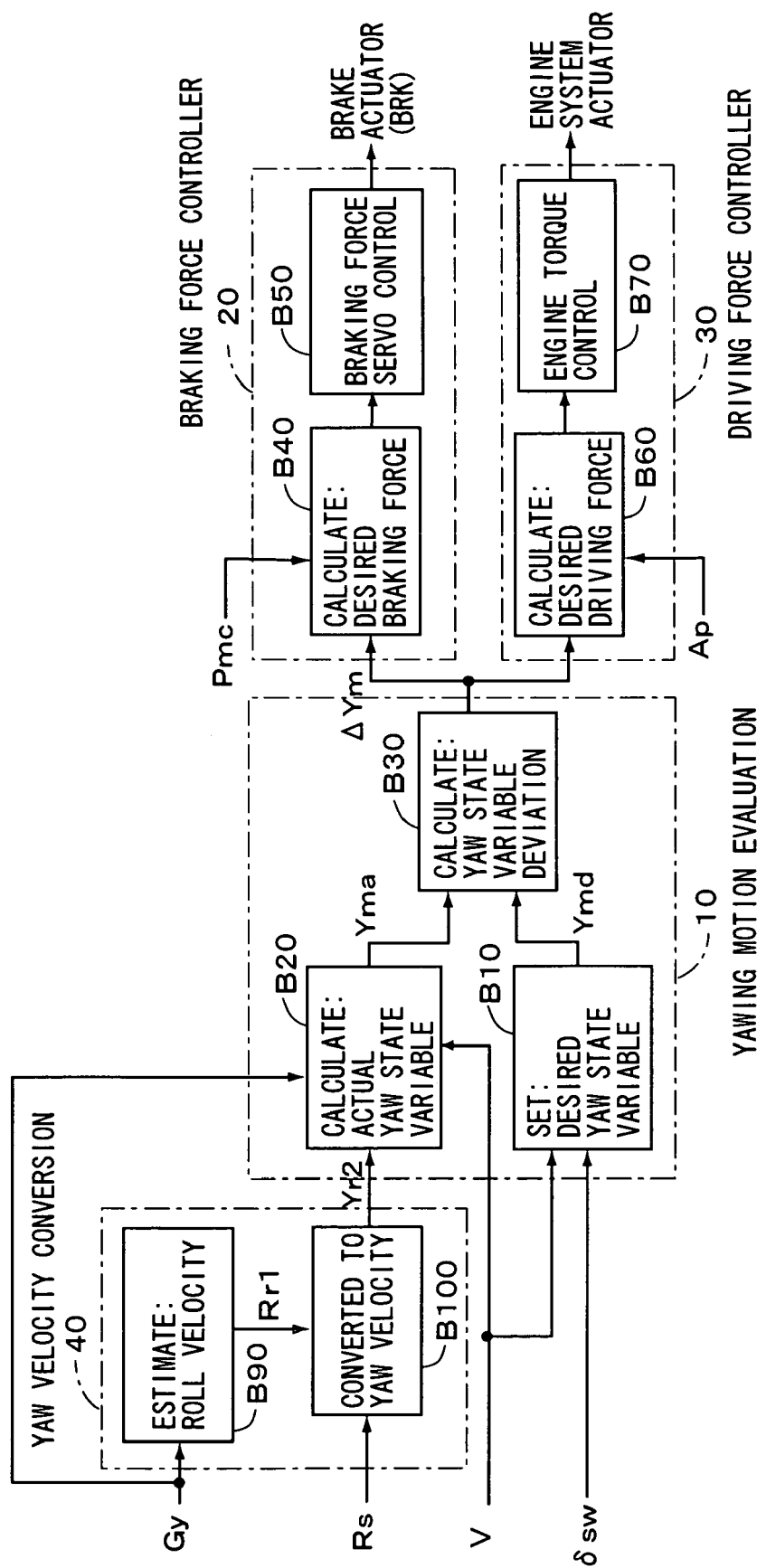
FIG. 9 is a block diagram of a device for performing a stability control for a vehicle motion, with an angular velocity detected by an angular velocity sensor having a tilted detecting axis, according to another embodiment of the present invention.

According to the embodiment as shown in FIG. 8, the angular velocity (Rs) has been simply converted by the actual tilt angle (θ), it may be so constituted that the roll velocity is estimated on the basis of other state variables of the vehicle, and the angular velocity (Rs) is converted by the estimated roll velocity into the yaw velocity, to perform the yawing motion stability control, whereby both of the yawing motion and the rolling motion can be stabilized, as explained with reference to FIG. 9. Provided that the roll velocity estimated on the basis of the lateral acceleration (Gy) is an estimated roll velocity (Rr1), a transfer function of the roll velocity of the vehicle to the lateral acceleration (Gy) is indicated by an equation (4) as follows;

$$Rr1 = \{m \cdot h \cdot s/(Ix \cdot s^2 + Cx \cdot s + Kx)\} \cdot Gy \quad (4)$$

where "m" is vehicle mass (when a suspension is taken into consideration, sprung mass), "h" is a height of the center of gravity of the vehicle (when the suspension is taken into consideration, a distance from the center of gravity of the vehicle to a roll axis), "Ix" is roll inertia, "Cx" is roll damping, "Kx" is roll stiffness, and "s" is Laplace transform operator.

In the equation (4), the estimated roll velocity (Rr1) is obtained in accordance with its relationship with the lateral acceleration (Gy), whereas the estimated roll velocity (Rr1) can be obtained on the basis of the steering angle (δsw) and the vehicle speed (V). At a block B100 as shown in FIG. 9, on the basis of the angular velocity (Rs) and the estimated roll velocity (Rr1), a component of roll velocity in the angular velocity (Rs) is deleted according to the following equation (5), to be converted into a yaw velocity of the vehicle, i.e., converted yaw velocity (Yr2).

$$Yr2=(Rs-Rr1\cdot\sin\theta)/\cos\theta \tag{5}$$

Accordingly, the yawing motion stability control is performed on the basis of the converted yaw velocity (Yr2). As the yawing motion evaluation device 10, braking force controller 20 and driving force controller 30 are the same as those shown in FIG. 5, explanation of them is omitted herein.

Figure 10:
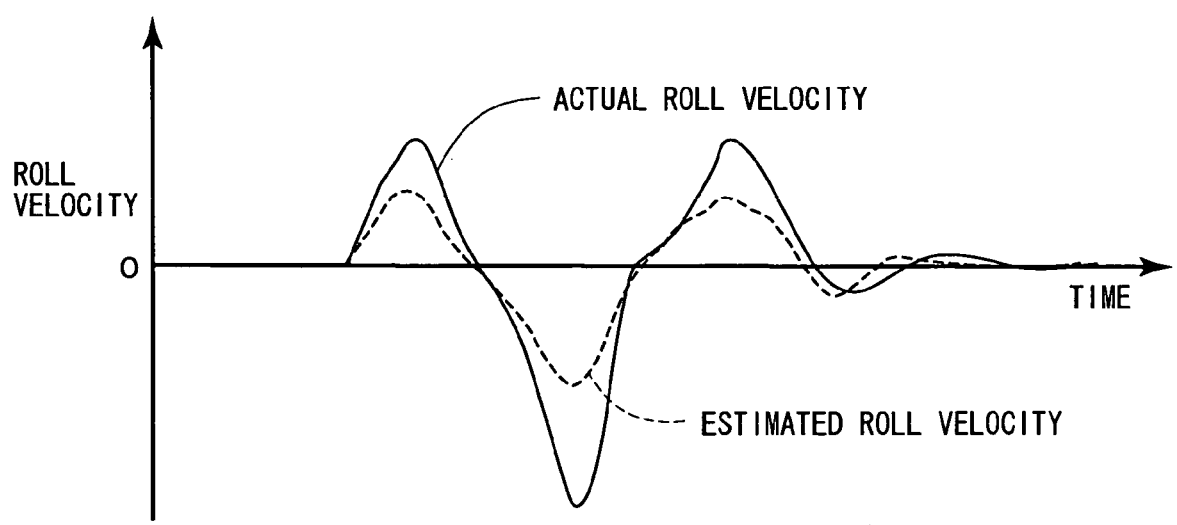
FIG. 10 is a diagram showing an example of variations of an actual roll velocity and an estimated roll velocity, in the case where a steering wheel was steered to turn a vehicle, then returned to its original position for moving the vehicle straight, according to another embodiment of the present invention.

In such a state that the center of gravity of the vehicle has been placed to be high, with the number of passengers being increased, or with loaded amount being increased, the roll increasing tendency of the vehicle will be likely caused. This is because the rolling moment will be applied largely, when the center of gravity of the vehicle is relatively high, even if the inertia force applied to the center of gravity of the vehicle is constant. Therefore, when the estimated roll velocity (Rr1) is calculated, vehicle parameters may be set to provide such a characteristic that the roll increasing tendency will be hardly caused. In this case, the vehicle parameters mean those based on the vehicle specifications relating to the rolling motion, such as the vehicle mass (m) (when the suspension is taken into consideration, sprung mass), the height of the center of gravity of the vehicle (h) (when the suspension is taken into consideration, the distance from the center of gravity of the vehicle to a roll axis), product of the mass and height (m·h), roll inertia (Ix), roll damping (Cx) and roll stiffness (Kx), as used in the equation (4). Thus, with the vehicle parameters for calculating the estimated roll velocity (Rr1) being set to provide the characteristic that the roll increasing tendency will be hardly caused, an accurate estimation of the roll velocity can be made, even in such a case that the height of the center of gravity of the vehicle is relatively low, so that the roll increasing tendency will be hardly caused. On the contrary, when the height of the center of gravity of the vehicle has become relatively high, with the number of passengers being increased, or with loading conditions being changed, the estimated roll velocity (Rr1) will be calculated to be smaller than the actual roll velocity, as shown in FIG. 10. Therefore, the converted yaw velocity (Yr2) is calculated to be larger than the actual yaw velocity, so that the yawing motion stability control will begin at an earlier timing, and larger braking force will be applied to the wheel to be controlled, whereby the rolling motion can be stabilized, together with the yawing motion.

According to the embodiments as described above, with the detecting axis of the angular velocity sensor tilted forward or backward of the vehicle, the yawing motion stability control is performed on the basis of the angular velocity signal, with its roll velocity component being increased relative to the yaw velocity of the vehicle, so that not only the yawing motion but also the rolling motion can be stabilized. In contrast, there is such an embodiment that the angular velocity about the detecting axis tilted forward or backward of the vehicle is divided into the yaw velocity and roll velocity, with the vehicle state variable being used, to perform the yawing motion stability control and rolling motion stability control, as explained hereinafter referring to FIG. 11. As the yaw velocity conversion device 40 and yawing motion evaluation device 10 are the same as those shown in FIG. 9, explanation of them is omitted herein.

Figure 11:
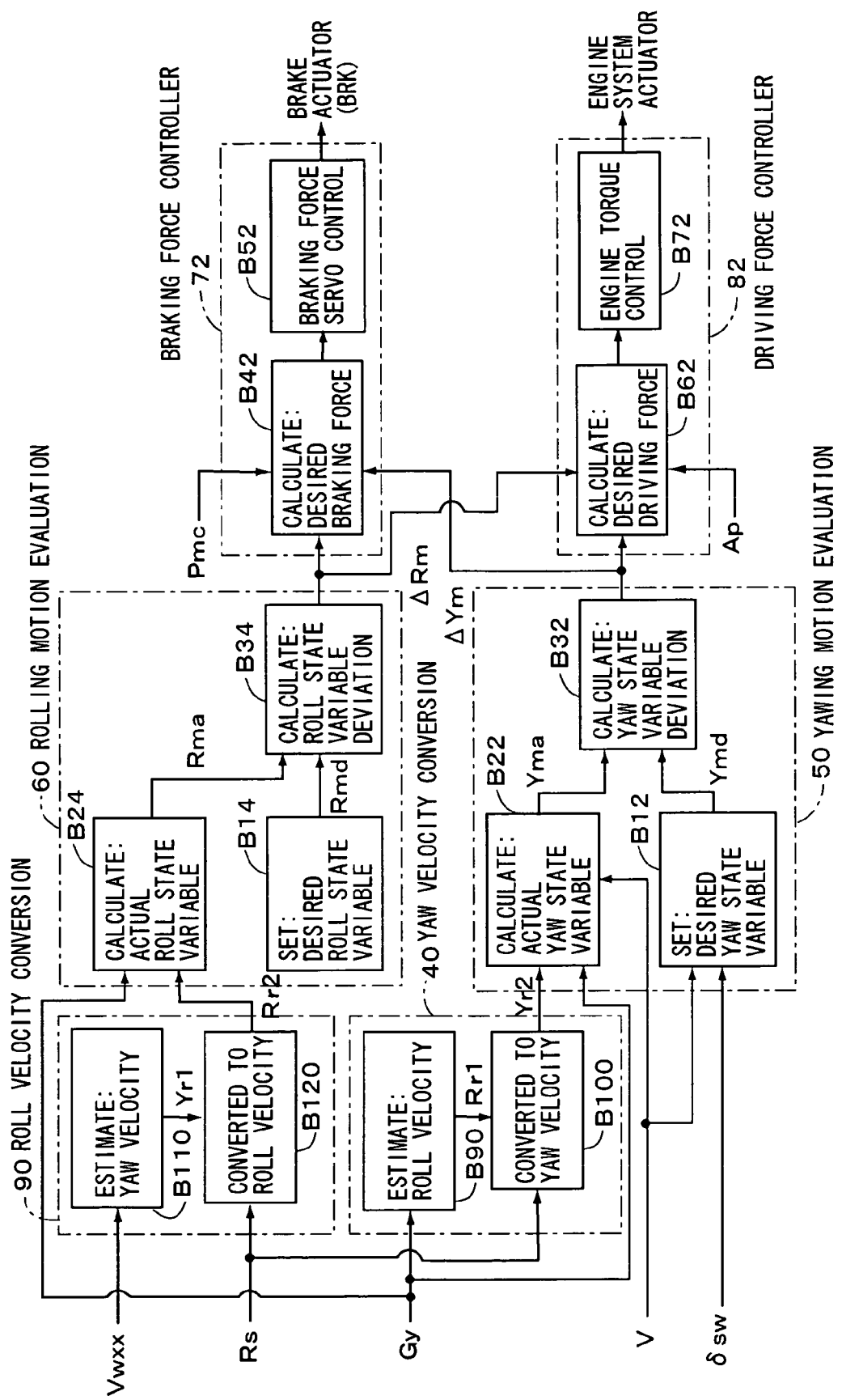
FIG. 11 is a block diagram of a device for dividing a vehicle state variable into a yaw velocity and a roll velocity, from an angular velocity detected by an angular velocity sensor having a tilted detecting axis, to perform a stability control for a yawing motion and a stability control for a rolling motion, according to a further embodiment of the present invention.

According to the roll velocity conversion device 90 as shown in FIG. 11, the roll velocity is estimated by deleting the yaw velocity component from the angular velocity (Rs), to be output into a rolling motion evaluation device 60. At a block B110, a difference ($\Delta$Vw) between right and left wheel speeds is calculated on the basis of the wheel speed (Vwxx) of each wheel, and based on the right and left wheel speed difference ($\Delta$Vw), an estimated yaw velocity (Yr1) is calculated according to an equation (6) as follows;

$$Yr1=\Delta Vw/Tr \tag{6}$$

where "Tr" is a tread of the vehicle.

Also, the yaw velocity can be estimated on the basis of the lateral acceleration (Gy) according to the following equation (6a). That is, an estimated yaw velocity (Yr1a) can be obtained as follows;

$$Yr1a=Gy/V \tag{6a}$$

Or, the yaw velocity can be estimated on the basis of the steering wheel angle ($\delta$sw) of the steering wheel SW according to the following equation (6b). That is, an estimated yaw velocity (Yr1b) can be obtained as follows;

$$Yr1b=[V/\{L\cdot(1+Kh\cdot V^2)\}]\,(\delta sw/N) \tag{6b}$$

where "L" is a wheel base, "Kh" is a stability factor, and "N" is a steering gear ratio.

At a block B120 as shown in FIG. 11, the estimated yaw velocity (Yr1) (or, Yr1a or Yr1b) is deleted from the angular velocity (Rs), to be converted into the roll velocity of the vehicle. That is, a converted roll velocity (Rr2) is calculated according to an equation (7) as follows;

$$Rr2=(Rs-Yr1\cdot\cos\theta)/\sin\theta \tag{7}$$

According to the rolling motion evaluation device 60, the rolling motion state of the vehicle is evaluated on the basis of the converted roll velocity (Rr2) separated from the angular velocity (Rs), to output a roll state variable deviation ($\Delta$Rm). At a block B14, a desired roll state variable (Rmd) is set on the basis of the lateral acceleration and roll velocity of the vehicle. It may be so constituted that the desired roll state variable (Rmd) is set in advance on the basis of the vehicle specifications or the like, and modified in accordance with a vehicle traveling state such as the vehicle speed. Or, it can be modified in accordance with the vehicle motion. At a block B24, an actual roll state variable (Rma) indicative of an actual rolling motion of the vehicle is calculated on the basis of the lateral acceleration (Gy) and the converted roll velocity (Rr2). Then, at a block B34, the roll state variable deviation ($\Delta$Rm) is calculated between the desired roll state variable (Rmd) and the actual roll state variable (Rma).

Figure 12:
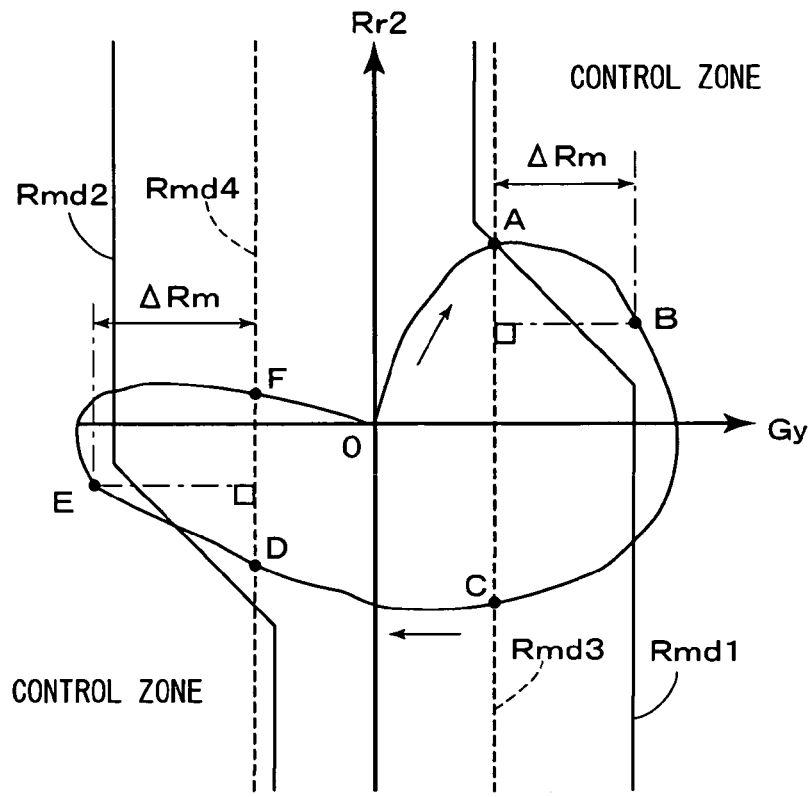
FIG. 12 is a diagram showing an example of a map for calculations by means of a rolling motion evaluation device, according to an embodiment of the present invention.

Referring to FIG. 12, will be explained operation of the rolling motion evaluation device 60 as described above. The desired roll state variable is initially set by characteristics (Rmd1 and Rmd2, references for left turning operation and right turning operation, respectively), as a two-dimensional relationship between the lateral acceleration and the roll velocity. In the case where the vehicle begins to perform its turning operation from its state moving straight (indicated by the origin (0)), its rolling state will be sifted as indicated by an arrow in FIG. 12. When the roll state variable (Rma) indicated by the lateral acceleration (Gy) and the converted roll velocity (Rr2) crosses the reference (Rmd1) in a direction to be increased, at a point (A) in FIG. 12, the lateral acceleration is set to be a new desired roll state variable (Rmd3). In this case, the desired roll state variable in the opposite turning direction is set to provide a reference (Rmd4). As shown in FIG. 12, the reference (Rmd4) is provided to be symmetrical relative to the reference (Rmd3) about the origin (0).

The roll state variable deviation (ΔRm) is calculated as a deviation between the actual roll state variable (Rma) and the reference (Rmd3 or Rmd4). When the actual roll state variable (Rma) crosses the reference (Rmd3) in a direction to be decreased, at a point (C), a control for a first direction turning operation is terminated. Then, when the actual roll state variable (Rma) crosses the reference (Rmd4) in a direction to be increased at a point (D), a control for a second direction turning operation begins, to calculate the roll state variable deviation (ΔRm) relative to the reference (Rmd4). The control for the second direction turning operation is terminated, when the actual roll state variable (Rma) crosses the reference (Rmd4) in a direction to be decreased, at a point (F).

According to a braking force controller 72, the desired braking force is set for each wheel, on the basis of the roll state variable deviation (ΔRm) output from the rolling motion evaluation device 60 and the yaw state variable deviation (ΔYm) output from the yawing motion evaluation device 50. Then, the braking force applied to each wheel is controlled by servo so as to equalize the actual braking force with the desired braking force, to output the control signal fed to the brake actuator BRK. When calculating the desired braking force, the brake pedal operation of the driver is taken into consideration, based upon the pressure signal (Pmc) output from the pressure sensor PS.

Figure 13:
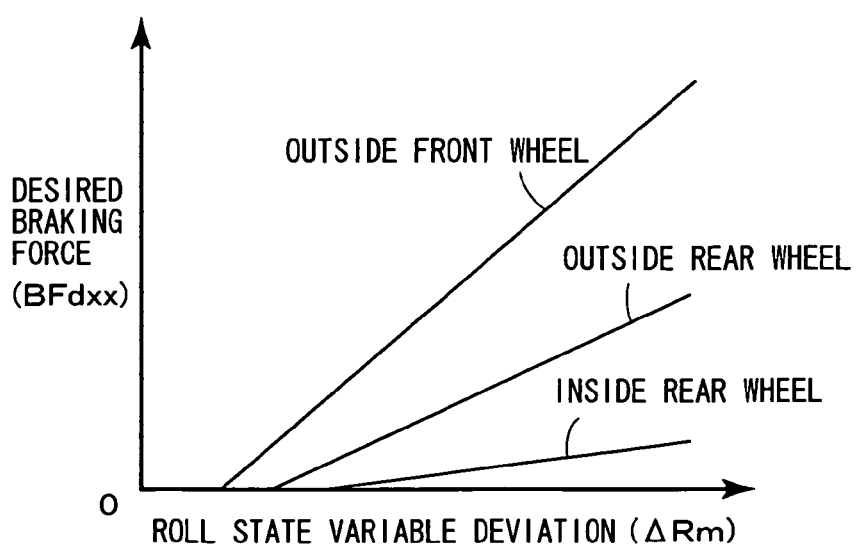
FIG. 13 is a diagram showing an example of a map for setting a desired braking force for a braking force control for stabilizing a rolling motion, according to a further embodiment of the present invention.

The desired braking force for stabilizing the rolling motion is set on the basis of the roll state variable deviation (ΔRm), as shown in FIG. 13. That is, in order to restrain the roll increasing tendency of the vehicle with an appropriate yawing moment being maintained, calculated is the desired braking force for each wheel of the front wheel located on the outside of the curve in the vehicle's path during cornering operation of the vehicle, rear wheel located on the outside of the curve, and rear wheel located on the inside of the curve, on the basis of the roll state variable deviation (ΔRm). In this case, it is most effective to apply the barking force to the front wheel located on the outside of the curve, because the largest braking force is applied by a load shift. Thus, the braking force control is executed in response to the roll state variable deviation (ΔRm), such that if the rolling motion is very severe with respect to the roll increasing tendency of the vehicle, relatively large braking force will be applied to restrain the roll increasing tendency. On the contrary, if the roll state variable deviation (ΔRm) is relatively small, while the roll increasing tendency of the vehicle has been found, minimal braking force for stabilizing the rolling motion will be applied, to restrain the different feeling given to the vehicle driver.

The desired braking force for stabilizing the yawing motion is set on the basis of the yaw state variable deviation (ΔYm), as shown in FIGS. 6 and 7. The desired braking force based on the yaw state variable deviation (ΔYm) is modified in accordance with a steering characteristic of the vehicle (oversteer or understeer characteristic). That is, in case of the oversteer, as shown in FIG. 6, it is so arranged that increase of the braking force applied to the front wheel located on the outside of the curve, and increase of the braking force applied to the rear wheel located on the outside of the curve are set on the basis of the yaw state variable deviation (ΔYm), respectively. And, with the braking force control being executed, the yawing moment directed to the outside of the curve during cornering operation is produced, and the vehicle speed is reduced. On the contrary, in case of the understeer, as shown in FIG. 7, it is so arranged that increase of the braking force applied to the rear wheel located on the inside of the curve, increase of the braking force applied to the rear wheel located on the outside of the curve, and increase of the braking force applied to the front wheel located on the outside of the curve during cornering operation are set on the basis of the yaw state variable deviation (ΔYm), respectively, so that the yawing moment directed to the inside of the curve is produced, and the vehicle speed is reduced.

As described before, decreasing the vehicle speed is effective to ensure the vehicle stability in the rolling motion and yawing motion. According to the present embodiment, therefore, in order to reduce the vehicle speed rapidly, with the yawing moment being controlled appropriately, one wheel or plurality of wheels may be selected as the wheel with the braking force thereof to be controlled, irrespective of the wheel to be controlled as described above. For example, it is effective to apply the braking force to all of four wheels, one wheel of the front wheel located on the outside of the curve, two front wheels and the rear wheel located on the inside of the curve, or two front wheels and the rear wheel located on the outside of the curve. Then, in the same manner as the aforementioned embodiment, the desired braking force, which is calculated on the basis of the roll state variable deviation (ΔRm) and the yaw state variable deviation (ΔYm), is added, or added with weight, to set the desired braking force for each wheel, based on which the brake actuator BRK is controlled. Likewise, the amount of engine torque to be reduced is determined on the basis of the roll state variable deviation (ΔRm) and the yaw state variable deviation (ΔYm) at a driving force controller 82, and the control signal is output to the engine system actuator (not shown) so as to control the throttle opening, ignition timing, amount of fuel to be injected and so on. The desired driving force is set on the basis of the amount (Ap) of operation of the accelerator pedal depressed by the vehicle driver.

According to the embodiment as shown in FIG. 11, the yaw velocity is converted from the roll velocity (Rr2) which is estimated on the basis of the angular velocity (Rs), with the vehicle state variable being used, and the roll velocity is converted from the estimated yaw velocity (Yr1), so that the braking force control and driving force control are performed, to stabilize the yawing motion and rolling motion. In contrast, according to the embodiment as shown in FIG. 14, a roll parameter (Rl) indicative of the roll increasing tendency of the vehicle is obtained, with the converted roll velocity (Rr2) being used, whereby the desired roll state variable can be set appropriately.

Figure 14:
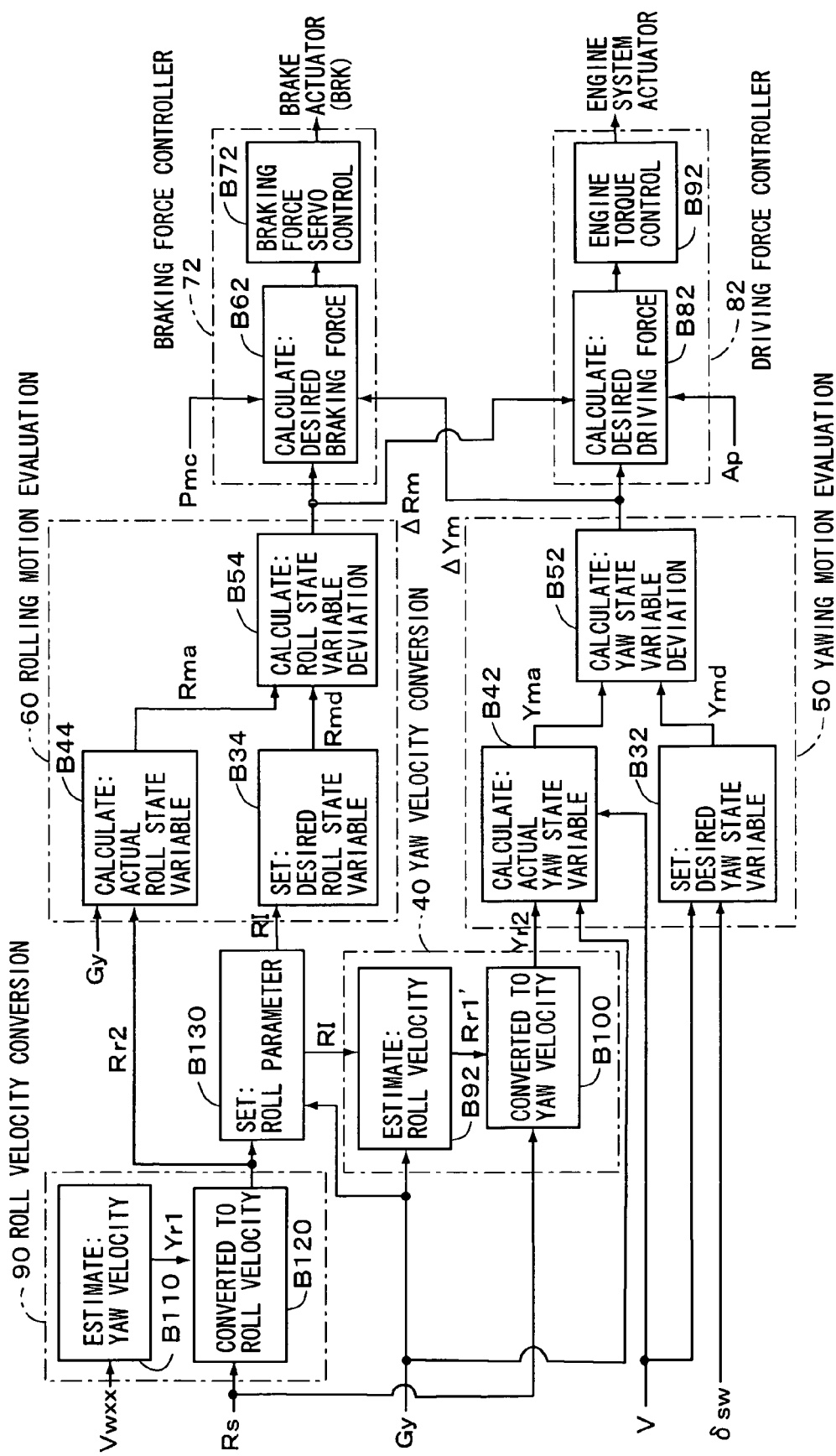
FIG. 14 is a block diagram of a device for obtaining a roll parameter indicative of a roll increasing tendency of a vehicle, with a converted roll velocity being used, to perform a stability control for a yawing motion and a stability control for a rolling motion, according to a further embodiment of the present invention.

According to the roll velocity conversion device 90 as shown in FIG. 14, the converted roll velocity (Rr2) is calculated in the same manner as the aforementioned embodiment. At a block B130, the roll parameter (Rl) indicative of the roll increasing tendency of the vehicle is calculated. In such a state that the center of gravity of the vehicle has been placed to be relatively high, with the number of passengers being increased, or with loading conditions being changed, the roll increasing tendency of the vehicle is increased. This is because the rolling moment will be applied largely, when the center of gravity of the vehicle is relatively high, even if the inertia force applied to the center of gravity of the vehicle is constant. Therefore, the roll parameter (Rl) is set to be a value based on the height of the center of gravity of the vehicle.

The roll parameter (Rl) is obtained by comparing the estimated roll velocity (Rr1), which is obtained by the equation (4) with the lateral acceleration (Gy) being used as described before, with the converted roll velocity (Rr2). That is, it can be considered from the equation (4) that the difference between the estimated roll velocity (Rr1) and the converted roll velocity (Rr2) is resulted from the factor (m·h). Therefore, the product (m·h) of the vehicle mass (m) (when the suspension is taken into consideration, sprung mass) and the height (h) of the center of gravity of the vehicle (when the suspension is taken into consideration, the distance from the center of gravity of the vehicle to the roll axis) is obtained, to provide the roll parameter (RI). When the roll parameter (RI) is relatively large, it means such a characteristic that the roll increasing tendency is likely caused.

The vehicle mass (m) can be estimated on the basis of the braking force applied to the wheel and the vehicle deceleration (Gx). Therefore, with the vehicle mass (m) being estimated every time when the vehicle speed is decreased, and with the height (h) of the center of gravity of the vehicle being obtained, the roll parameter (RI) can be provided. As described before, the estimated roll velocity (Rr1) can be expressed by the transfer function of the steering wheel angle (δsw) and the vehicle speed (V), the roll parameter (RI) may be obtained by comparing the converted roll velocity (Rr2) with the estimated roll velocity (Rr1) calculated by the steering wheel angle (δsw) and the vehicle speed (V).

Depending on a state for setting the tilt angle (θ) of the angular velocity sensor RS, there may be a case where sufficient resolution can not be provided for the estimated roll velocity (Rr1). In that case, it is unnecessary to obtain the roll parameter (RI) as a continuous value. For example, the roll parameter (RI) may be indicated by a parameter with two stage of large value and small value, or a plurality of stages. Furthermore, the roll parameter (RI) is estimated every time when the vehicle is turned. Therefore, the factor (m·h) in the equation (4) may be modified on the basis of the estimated roll parameter (RI), to calculate an accurately estimated roll velocity (Rr1'), and obtain the converted yaw velocity (Yr2).

Next will be explained the desired roll state variable (Rmd) based on the roll parameter (RI), with reference to FIG. 15. The desired roll state variable (Rmd) has a characteristic for estimating the roll increasing tendency of the vehicle, which is indicated by the two-dimensional relationship between the lateral acceleration and the roll velocity. The desired roll state variable (Rmd) is set on the basis of the roll parameter (RI). The larger the roll parameter (RI) is, the more likely the roll increasing tendency is caused. Therefore, when the roll parameter (RI) is relatively large, the desired roll state variable (Rmd) is set to be a relatively small reference (Rmd5), as indicated by a solid line (a-b-c-d) in FIG. 15. Then, even if the actual roll state variable (Rma) is relatively small, the braking force control and driving force control for stabilizing the rolling motion begin to be performed, and relatively large braking force is applied, to ensure the vehicle stability.

Figure 15:
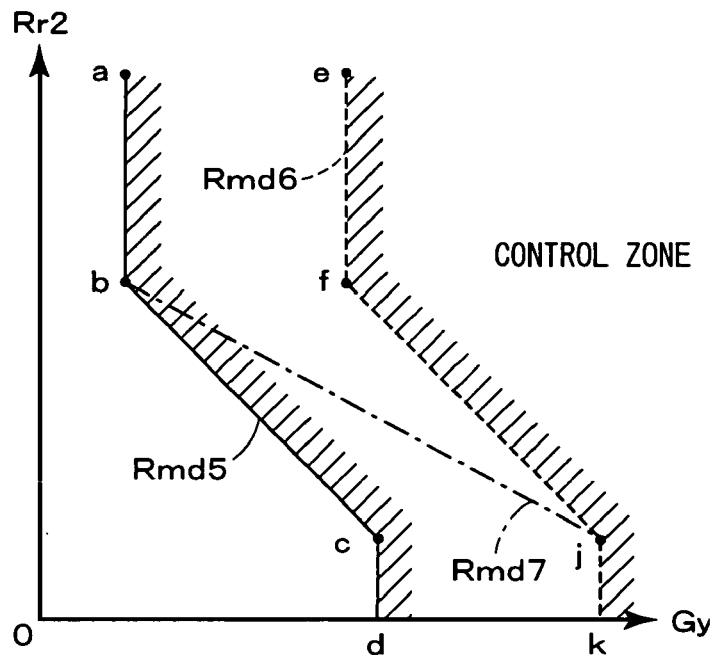
FIG. 15 is a diagram showing a state for setting a desired roll state variable, according to a further embodiment of the present invention.

On the other hand, in the case where the roll parameter (RI) is relatively small, the desired roll state variable (Rmd) is set to be a relatively large reference (Rmd6), as indicated by a broken line (e-f-j-k) in FIG. 15. Consequently, unnecessary braking force control and driving force control will be restrained, and controlled to avoid giving a different feeling to the vehicle driver. Or, only the state variable of lateral acceleration may be varied on the basis of the roll parameter (RI). Thus, in the case where the desired roll state variable (Rmd) is set, the [a-b-c-d] characteristic (solid line) is set, when the roll parameter (RI) is relatively large, and it is changed into a [a-b-j-k] characteristic (one-dot chain line) is set, when the roll parameter (RI) is relatively small. When the desired roll state variable is set, the vehicle speed (V) may be taken into consideration, such that the desired roll state variable is set to be relatively low, when the vehicle speed is relatively high, to perform more stable control.

The evaluation made by the yawing motion evaluation device 50 is the one for evaluating whether the vehicle motion on the yaw plane is stable or not, which is performed by a known device for the yawing motion stability control. Likewise, the evaluation made by the rolling motion evaluation device 60 is the one for evaluating whether the vehicle motion on the roll plane is stable or not, which is performed by a known device for the rolling motion stability control. Also, with respect to the rolling motion evaluation device 60, it is explained that the roll state variable deviation is calculated by the two-dimensional relationship between the lateral acceleration and the roll velocity. However, the present invention is not limited to those state variables, but may be various state variables indicative of the rolling motion, and one or plurality of state variables out of them may be used, to provide the roll state variable.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle motion stability control apparatus for controlling at least one of braking force and driving force applied to a vehicle, to stabilize a motion thereof, comprising:

angular velocity detection means for detecting an angular velocity about a single axis tilted in a longitudinal direction of said vehicle to a normal axis of said vehicle;

actual motion state variable calculation means for calculating an actual motion state variable indicative of an actual vehicle motion state variable of said vehicle, on the basis of the angular velocity detected by said angular velocity detection means;

desired motion state variable setting means for setting a desired motion state variable indicative of a desired vehicle motion state variable of said vehicle;

motion state variable deviation calculation means for calculating a deviation between the desired motion state variable set by said desired motion state variable setting means and the actual motion state variable calculated by said actual motion state variable calculation means; and control means for controlling at least one of the braking force and driving force applied to said vehicle, on the basis of the deviation calculated by said motion state variable deviation calculation means.

2. A vehicle motion stability control apparatus as set forth in claim 1, wherein the vehicle motion state variable is a yaw state variable indicative of a state variable of a yawing motion of said vehicle, and wherein the desired motion state variable is a desired yaw state variable, the actual motion state variable is an actual yaw state variable, and the deviation between the desired motion state variable and the actual motion state variable is a yaw state variable deviation between the desired yaw state variable and the actual yaw state variable.

3. A vehicle motion stability control apparatus as set forth in claim 1, wherein the vehicle motion state variable is a roll state variable indicative of a state variable of a rolling motion of said vehicle, and wherein the desired motion state variable is a desired roll state variable, the actual motion state variable is an actual roll state variable, and the deviation between the desired motion state variable and the actual motion state variable is a roll state variable deviation between the desired roll state variable and the actual roll state variable.

4. A vehicle motion stability control apparatus as set forth in claim 1, further comprising:

yaw velocity estimation means for estimating a yaw velocity of said vehicle on the basis of the vehicle motion state variable;

roll velocity conversion means for converting the angular velocity detected by said angular velocity detection means into a roll velocity of said vehicle, on the basis of the yaw velocity estimated by said yaw velocity estimation means; and roll parameter estimation means for estimating a roll parameter indicative of a roll increasing tendency of said vehicle, on the basis of the roll velocity converted by said roll velocity conversion means, and wherein said control means controls at least one of the braking force and driving force applied to said vehicle, on the basis of the roll parameter estimated by said roll parameter estimation means.

5. A vehicle motion stability control apparatus as set forth in claim 1, wherein the single axis of said angular velocity detection means is tilted forward of said vehicle to the normal axis of said vehicle.

* * * * *